US012300456B2

(12) United States Patent
Sullivan et al.

(10) Patent No.: US 12,300,456 B2
(45) Date of Patent: May 13, 2025

(54) SWITCHING DEVICES INCORPORATING RUPTURE DISK

(71) Applicant: Gigavac, LLC, Carpinteria, CA (US)

(72) Inventors: Daniel Sullivan, Santa Barbara, CA (US); Samuel Naumowicz, Carpinteria, CA (US); Keith Singer, Attleboro, MA (US); Ewoud Roest, Enschede (NL)

(73) Assignee: Gigavac, LLC, Carpinteria, CA (US)

( * ) Notice: Subject to any disclaimer, the term of this patent is extended or adjusted under 35 U.S.C. 154(b) by 0 days.

(21) Appl. No.: 16/951,999

(22) Filed: Nov. 18, 2020

(65) Prior Publication Data

US 2021/0151265 A1 May 20, 2021

Related U.S. Application Data

(60) Provisional application No. 62/937,692, filed on Nov. 19, 2019.

(51) Int. Cl.
*H01H 9/04* (2006.01)

(52) U.S. Cl.
CPC .................................. *H01H 9/043* (2013.01)

(58) Field of Classification Search
CPC ...... H01H 9/043; H01H 39/00; H01H 50/023; H01H 2050/025; H01H 85/0078; H01H 85/43; H01H 9/047; H01H 51/29
USPC .......................................................... 200/300
See application file for complete search history.

(56) References Cited

U.S. PATENT DOCUMENTS

| | | | |
|---|---|---|---|
| 2,729,722 A | 1/1956 | Nelsen |
| 2,999,912 A | 9/1961 | Kincaid |
| 3,393,605 A | 7/1968 | Parnell |
| 3,394,843 A | 7/1968 | Grady et al. |

(Continued)

FOREIGN PATENT DOCUMENTS

| | | |
|---|---|---|
| CN | 1967762 A | 5/2007 |
| CN | 103762129 A | 4/2014 |

(Continued)

OTHER PUBLICATIONS

Notice of Allowance dated Sep. 22, 2021 for U.S. Appl. No. 15/889,516 (pp. 1-5).

(Continued)

*Primary Examiner* — Elim Ortiz
*Assistant Examiner* — Xuan Ly
(74) *Attorney, Agent, or Firm* — Lee & Hayes, P.C.

(57) ABSTRACT

Electrical switching devices are disclosed that have pressure relief mechanisms to allow for the release of internal pressure within the switching device housing. The pressure within the housing can be caused by different events with one such event being internal arcing within the housing caused during operation of the housing's internal components. Is some cases the arcing can be caused during separation of the switching device contacts. The pressure relief mechanism allows for the high pressure to pass from the housing in a more controlled matter to minimize or prevent high pressure breach or rupture of the switching device housing. The pressure relief mechanisms are particularly applicable to switching devices with hermetically sealed housings. Many different pressure relief mechanisms can be used including rupture disks or engineered weak points in the switching device housing.

19 Claims, 15 Drawing Sheets

(56) References Cited

U.S. PATENT DOCUMENTS

| | | | |
|---|---|---|---|
| 3,724,870 | A | 4/1973 | Orita |
| 3,796,980 | A | 3/1974 | Ellsworth |
| 3,873,786 | A | 3/1975 | Lagofun |
| 4,168,480 | A | 9/1979 | De Lucia |
| 4,224,487 | A | 9/1980 | Simonsen |
| 4,354,072 | A | 10/1982 | Noeske |
| 5,583,729 | A | 12/1996 | Hassler |
| 5,920,029 | A | 7/1999 | Teaford |
| 6,136,114 | A | 10/2000 | Johnson |
| 6,194,988 | B1 | 2/2001 | Yamaguchi |
| 7,123,124 | B2 | 10/2006 | Caruso |
| 7,205,879 | B2 | 4/2007 | Kordel |
| 7,222,561 | B2 | 5/2007 | Brede |
| 7,321,281 | B2 | 1/2008 | Molyneux |
| 7,511,600 | B2 | 3/2009 | Von Behr |
| 7,772,958 | B2 | 8/2010 | Schloetzer |
| 7,944,333 | B2 | 5/2011 | Swartzentruber |
| 8,164,868 | B2 | 4/2012 | Dommaschk |
| 8,446,240 | B2 | 5/2013 | Swartzentruber |
| 8,446,241 | B2 | 5/2013 | Filiputti |
| 9,013,254 | B2 | 4/2015 | Molyneux |
| 9,236,208 | B2 | 1/2016 | Ukon |
| 9,887,055 | B2 | 2/2018 | Mctigue |
| 2004/0041682 | A1 | 3/2004 | Pasha |
| 2004/0112239 | A1 | 6/2004 | Parks |
| 2008/0084260 | A1* | 4/2008 | Swartzentruber .... H01H 50/023 335/151 |
| 2009/0127229 | A1 | 5/2009 | Schmitz |
| 2009/0141416 | A1 | 6/2009 | Dommaschk |
| 2010/0089739 | A1 | 4/2010 | Filiputti |
| 2010/0097166 | A1 | 4/2010 | Hasel |
| 2010/0218659 | A1 | 9/2010 | Ukon |
| 2013/0126326 | A1 | 5/2013 | Borg |
| 2014/0014194 | A1 | 1/2014 | Kim |
| 2015/0206681 | A1 | 7/2015 | Marlin |
| 2016/0365210 | A1* | 12/2016 | Blackmon .............. H01H 51/29 |
| 2017/0069450 | A1 | 3/2017 | Birner et al. |
| 2017/0229267 | A1 | 8/2017 | Lell |
| 2017/0229268 | A1 | 8/2017 | Goldman |
| 2017/0236663 | A1 | 8/2017 | Jung |
| 2018/0166246 | A1 | 6/2018 | Mctigue |
| 2019/0198277 | A1 | 6/2019 | Mctigue |
| 2019/0203845 | A1* | 7/2019 | Tomasko ............ F16K 17/1606 |
| 2019/0299787 | A1 | 10/2019 | Betscher |
| 2019/0305529 | A1* | 10/2019 | Sims .................... H02B 13/045 |
| 2020/0279711 | A1 | 9/2020 | Mathieu |

FOREIGN PATENT DOCUMENTS

| | | | |
|---|---|---|---|
| CN | 104025241 | A | 9/2014 |
| CN | 104241056 | A | 12/2014 |
| CN | 107710370 | A | 2/2018 |
| CN | 109211305 | * | 1/2019 |
| CN | 109273328 | A | 1/2019 |
| DE | 241431 | | 3/1976 |
| DE | 0545508 | * | 6/1993 |
| DE | 202012013004 | | 8/2014 |
| DE | 102014007459 | A1 | 11/2015 |
| DE | 102016101252 | A1 | 7/2017 |
| DE | 102018133636 | A1 | 7/2019 |
| DE | 102018109824 | B3 | 9/2019 |
| EP | 0548390 | A1 | 6/1993 |
| EP | 563947 | A1 | 10/1993 |
| EP | 0681352 | A2 | 11/1995 |
| FR | 2741994 | A1 | 6/1997 |
| GB | 143554 | | 5/1976 |
| GB | 1435544 | | 5/1976 |
| GB | 2572236 | A | 9/2019 |
| JP | S60184230 | U | 12/1985 |
| JP | H037006 | Y2 | 2/1991 |
| JP | H0688108 | U | 12/1994 |
| JP | 2001195970 | A | 7/2001 |
| JP | 2014107199 | A | 6/2014 |
| JP | 2017117678 | A | 6/2017 |
| KR | 100868681 | B | 11/2008 |
| KR | 100868681 | B1 | 11/2008 |
| KR | 10-2018-0016578 | A | 2/2018 |
| WO | 2008095452 | | 8/2008 |
| WO | 2009041064 | A1 | 4/2009 |
| WO | WO2016201026 | A1 | 12/2016 |
| WO | 2019097152 | A1 | 5/2019 |

OTHER PUBLICATIONS

Chinese Office Action (with English translation) for App. No. CN202010183787.5, dated Sep. 3, 2021, 17 pages.
Office Action dated Sep. 18, 2020 for U.S. Appl. No. 16/794,030 (pp. 1-4).
EP-563947-A1, English Translation (Year: 1993).
FR-2741994-A1, English Translation (Year: 1997).
PCT International Search Report for Application No. PCT/US2016/032199; dated Jul. 22, 2016.
French Search Report and Written Opinion for App. No. FR2011828, dated Nov. 26, 2021, 16 pages.
Office Action (Notice of Allowance and Fees Due (PTOL-85)) dated Jan. 5, 2022 for U.S. Appl. No. 15/889,516 (pp. 1-4).
French Office Action for App. No. FR2009839, dated Jan. 8, 2021, 2 pages.
French Office Action (with English translation) for App. No. FR2011828, dated Apr. 6, 2021, 8 pages.
Search Report for App. No. GB2015333.4, dated Mar. 11, 2021, 5 pages.
Search Report for App. No. GB2018225.9, dated May 13, 2021, 5 pages.
Office Action dated Jul. 30, 2021 for U.S. Appl. No. 16/794,030 (pp. 1-12).
Machine Translation for FR 2741994.
Office Action (Notice of Allowance and Fees Due (PTOL-85)) dated Nov. 17, 2021 for U.S. Appl. No. 15/889,516 (pp. 1-2).
French Office Action mailed Nov. 26, 2021, for French Patent Application No. 2011828, a foreign counterpart to U.S. Appl. No. 16/951,999, 9 pages.
Office Action for Chinese Application No. 202011306461.3, Dated Jun. 28, 2024, 16 pages.
Korean Office Action mailed Sep. 25, 2023 for Korean Patent Application No. 10-2020-0155624, a foreign counterpart to U.S. Appl. No. 16/951,999, 4 pages.
Office Action for KR Patent Application 10-2020-0155624, mailed on Jan. 28, 2023, a foreign counterpart to U.S. Appl. No. 16/951,999, Sullivan, "Switching Device Incorporating Rupture Disk", 10 pages.
Office Action for Chinese Application No. 202011306461.3, Dated Dec. 2, 2024, 10 pages.
Office Action for Great Britain Application No. 2018225.9, Dated Oct. 29, 2024, 6 pages.
Office Action for Japanese Application No. 2020-192630, Dated Oct. 8, 2024, 14 pages.

* cited by examiner

SWITCHING DEVICES INCORPORATING RUPTURE DISK

This application claims the benefit of U.S. Provisional Patent Application Ser. No. 62/937,692, filed on Nov. 19, 2019.

BACKGROUND

Field of the Invention

Described herein are devices relating to electrical switching devices, such as contactor devices and electrical fuse devices that utilize a rupturing disk.

Description of the Related Art

Connecting and disconnecting electrical circuits is as old as electrical circuits themselves and is often utilized as a method of switching power to a connected electrical device between "on" and "off" states. An example of one device commonly utilized to connect and disconnect circuits is a contactor, which is electrically connected to one or more devices or power sources. A contactor is configured such that it can interrupt or complete a circuit to control electrical power to and from a device. One type of conventional contactor is a hermetically sealed contactor.

In addition to contactors, which serve the purpose of connecting and disconnecting electrical circuits during normal operation of a device, various additional devices can be employed to provide overcurrent protection. These devices can prevent short circuits, overloading, and permanent damage to an electrical system or a connected electrical device. These devices include disconnect devices which can quickly break the circuit in a permanent way such that the circuit will remain broken until the disconnect device is repaired, replaced, or reset. One such type of disconnect device is a fuse. A conventional fuse is a type of low resistance conductor that acts as a sacrificial device. Typical fuses comprise a metal wire or strip that melts when too much current flows through it, interrupting the circuit that it connects.

As society advances, various innovations to electrical systems and electronic devices are becoming increasingly common. An example of such innovations includes recent advances in electrical automobiles, which are becoming the energy-efficient standard and will replace most traditional petroleum-powered vehicles. In such expensive and routinely used electrical devices, overcurrent protection is particularly applicable to prevent device malfunction and prevent permanent damage to the devices. Furthermore, overcurrent protection can prevent safety hazards, such as electrical shock to bystanders and electrical fires. These modern improvements to electrical systems and devices require modern solutions to increase safety, convenience and efficiency.

One concern with conventional contactors and fuse devices is the handling of internal pressure that can form during operation. One source of this internal pressure can be arcing between the internal components of the devices during operation. This concern of internal pressure build-up can be even greater for hermitically sealed devices. If the internal pressure becomes too great the housing can experience an uncontrolled breach. This may not only render the device inoperable, but the breach and release of pressure can present a danger to the remainder of the electrical system and any occupants in or near the system.

SUMMARY

The present invention is directed to electrical switching devices having pressure relief mechanisms to allow for the release of internal pressure within the switching device housing. The pressure within the housing can be caused by different events with one such event being internal arcing within the housing caused during operation of the housing's internal components. Is some cases the arcing can be caused during separation of the switching device contacts. The pressure relief mechanism according to the present invention allows for the high pressure to pass from the housing in a more controlled matter to minimize or prevent high pressure breach or rupture of the switching device housing.

The present invention can be used with different switching devices but is particularly applicable to switching devices with hermetically sealed housings. Many different pressure relief mechanisms can be used including rupture disks or engineered weak points in the switching device housing.

One embodiment of an electrical switching device according to the present invention comprises a hermitically sealed housing and internal components within the hermetically sealed housing. The internal components can be configured to change the state of the switching device from a closed state and an open state in response to input. In the closed state current is allowed current flow through the device and in the open state current flow through said device is interrupted. Contact structures can be include that are electrically connected the internal components and are also available for connection to external circuitry. The housing comprises pressure relief mechanism to allow pressure internal to the housing to escape from said housing.

These and other further features and advantages of the invention would be apparent to those skilled in the art from the following detailed description, taken together with the accompanying drawings, wherein like numerals designate corresponding parts in the figures, in which:

DETAILED DESCRIPTION

Figure 1:
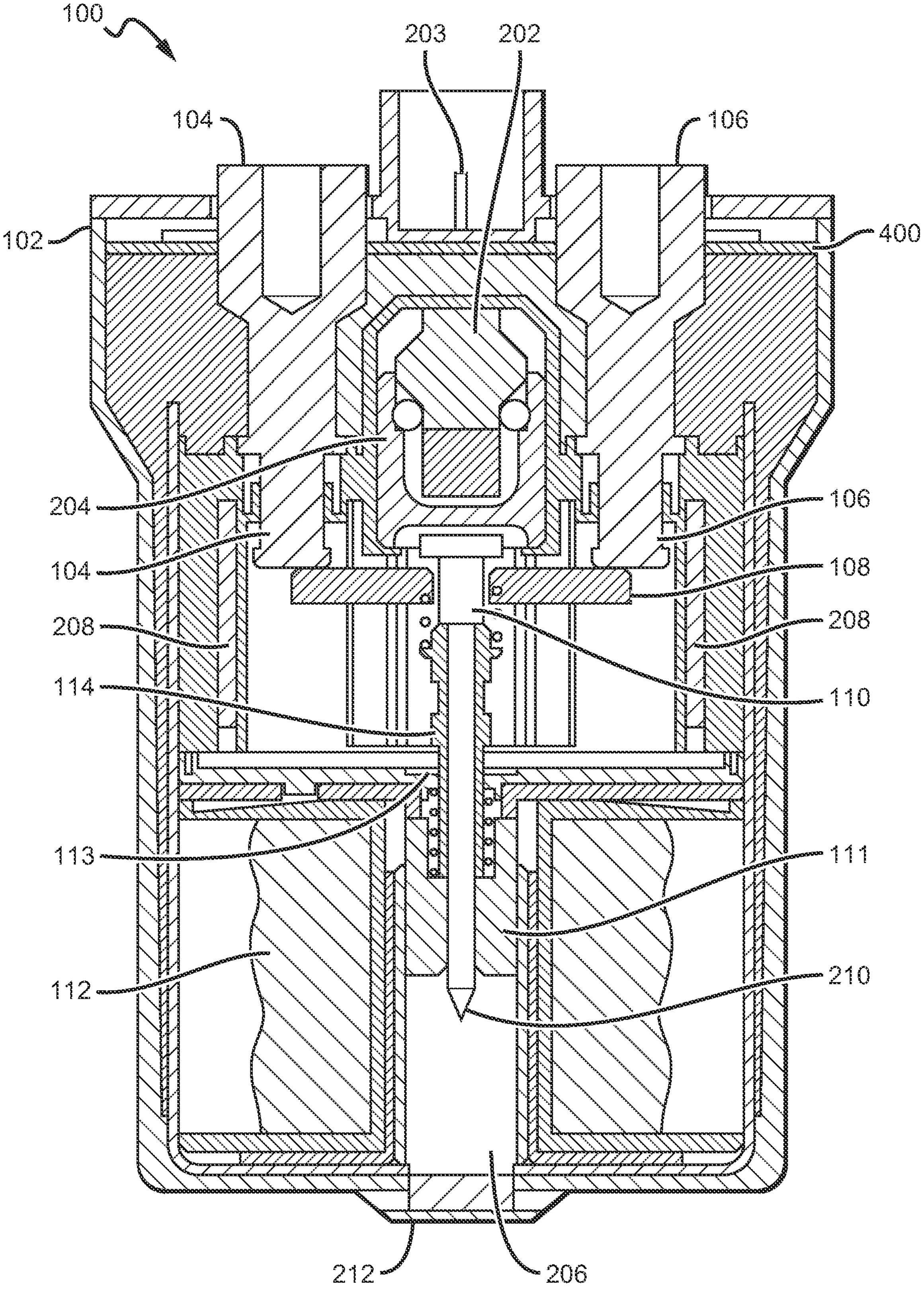
FIG. 1 is a front sectional view of one embodiment of a contactor able to incorporate features of capable of incorporating the pressure relief mechanisms according to the present invention.

The present disclosure will now set forth detailed descriptions of various embodiments of switching devices according to the present invention. The present invention can be used in many different switching devices such as contactors or fuse devices. These switching devices can be electrically connected to an electrical device or system to turn power to the connected device or system "on" or "off."

The switching devices can comprise a hermetically sealed housing, and during separation of the contacts during transition from the "on" to the "off" state, arcing can occur between the contacts. At higher current levels, the arcing can cause an increase pressure within the switching device housing. At elevated pressures, there is a possibility that the switching device housing could breach or rupture. To minimize or eliminate the possibility of housing breach, the switching devices according to the present invention can comprise pressure relief mechanisms to release the arcing pressure before housing breach. The different embodiments can comprise many different pressure relief mechanisms, with some embodiments comprising a rupture disk or engineered weak point in the switching device housing. These can open during a high-pressure event to allow air or gas to pass from the housing.

Throughout this description, the preferred embodiment and examples illustrated should be considered as exemplars, rather than as limitations on the present invention. As used herein, the term "invention," "device," "present invention," or "present device" refers to any one of the embodiments of the invention described herein, and any equivalents. Furthermore, reference to various feature(s) of the "invention," "device," "present invention," or "present device" throughout this document does not mean that all claimed embodiments or methods must include the referenced feature(s).

It is also understood that when an element or feature is referred to as being "on" or "adjacent" to another element or feature, it can be directly on or adjacent to the other element or feature or intervening elements or features may also be present. It is also understood that when an element is referred to as being "attached," "connected" or "coupled" to another element, it can be directly attached, connected or coupled to the other elements or intervening elements may be present. In contrast, when an element is referred to as being "directly attached," "directly connected" or "directly coupled" to another element, there are no intervening elements present.

Relative terms, such as "outer," "above," "lower," "below," "horizontal," "vertical" and similar terms, may be used herein to describe a relationship of one feature to another. It is understood that these terms are intended to encompass different orientations in addition to the orientation depicted in the figures.

The terminology used herein is for describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," when used herein, specify the presence of stated features, integers, steps, operations, elements, and/or components, but do not preclude the presence or addition of one or more other features, integers, steps, operations, elements, components, and/or groups thereof.

Embodiments of the invention are described herein with reference to different views and illustrations that are schematic illustrations of idealized embodiments of the invention. As such, variations from the shapes of the illustrations as a result, for example, of manufacturing techniques and/or tolerances are expected. Embodiments of the invention should not be construed as limited to the particular shapes of the regions illustrated herein, but are to include deviations in shapes that result, for example, from manufacturing.

Before describing specific pressure relief features or mechanisms according to the present invention, examples of switching devices that can incorporate these features will be described. These are only exemplar switching devices and the present invention can in many other switching devices and in devices other than switching devices. Some of many different switching devices that can utilize the present invention comprise contactors and fused configured to allow switching of a device between an "on" and "off" states.

In reference to an example contactor device that can utilize one or more pressure relief mechanisms according to the present invention, FIG. 1 shows a sectional view of a contactor device 100 in a "closed" circuit position, wherein flow of electricity through the contactor device is enabled. The contactor device 100 can comprise a body 102 (also referred to as a housing 102), and two or more fixed contact structures 104, 106 (two shown) which are configured to electrically connect the internal components of the contactor device to external circuitry, for example, to an electrical system or device.

The body 102 can comprise any suitable material that can support the structure and function of the contactor device 100 as disclosed herein, with a preferred material being a sturdy material that can provide structural support to the contactor device 100 without interfering with the electrical flow through the fixed contacts 104, 106 and the internal components of the device. In some embodiments, the body 102 comprises a durable plastic or polymer. The body 102 at least partially surrounds the various internal components of the contactor device 100, which are described in more detail further herein.

The body 102 can comprise any shape suitable for housing the various internal components including any regular or irregular polygon. The body 102 can be a continuous structure, or can comprise multiple component parts joined together, for example, comprising a base body "cup," and a top "header" portion sealed with an epoxy material. Some example body configurations include those set forth in U.S. Pat. Nos. 7,321,281, 7,944,333, 8,446,240 and 9,013,254, all of which are assigned to Gigavac, Inc., the assignee of the present application, and all of which are hereby incorporated in their entirety by reference.

The fixed contacts 104, 106 are configured such that the various internal components of the contactor device 100 that are housed within the body 102 can electrically communicate with an external electrical system or device, such that the contactor device 100 can function as a switch to break or complete an electrical circuit as described herein. The fixed contacts 104, 106 can comprise any suitable conductive material for providing electrical contact to the internal components of the contactor device, for example, various metals and metallic materials or any electrical contact material or structure that is known in the art. The fixed contacts 104, 106 can comprise single continuous contact structures (as shown) or can comprise multiple electrically connected structures. For example, in some embodiments, the fixed contacts 104, 106 can comprise two portions, a first portion extending from the body 102, which is electrically connected to a second portion internal to the body 102 that is configured to interact with other components internal to the body as described herein.

The body 102 can be configured such that the internal space of the body 102, which houses the various internal components of the contactor device 100, is hermetically sealed. When coupled with the use of electronegative gas, this hermetically sealed configuration can help mitigate or prevent electrical arcing between adjacent conductive elements, and in some embodiments, helps provide electrical isolation between spatially separated contacts. In some embodiments, the body 102 can be under vacuum conditions. The body 102 can be hermetically sealed utilizing any known means of generating hermetically sealed electrical devices. Some examples of hermetically sealed devices include those set forth in U.S. Pat. Nos. 7,321,281, 7,944,333, 8,446,240 and 9,013,254, all of which are assigned to Gigavac, Inc., the assignee of the present application, and all of which are incorporated into the present application in their entirety by reference.

In some embodiments, the body 102 can be at least partially filled with an electronegative gas, for example, sulfur hexafluoride or mixture of nitrogen and sulfur hexafluoride. In some embodiments, the body 102 comprises a material having low or substantially no permeability to a gas injected into the housing. In some embodiments, the body can comprise various gasses, liquids or solids configured to increase performance of the device.

When not interacting with any of the other components internal to the body 102, the fixed contacts 104, 106 are otherwise electrically isolated from one another such that electricity cannot freely flow between them. The fixed contacts 104, 106 can be electrically isolated from one another through any known structure or method of electrical isolation.

When the contactor device 100 is in its "closed" position, as shown in FIG. 1, both of the otherwise electrically isolated fixed contacts 104, 106 are contacted by a moveable contact 108. The moveable contact 108 functions as a bridge allowing an electrical signal to flow through the device, for example, from the first fixed contact 104, to the moveable contact 108, to the second contact 106 or vice versa. Therefore, the contactor device 100 can be connected to an electrical circuit, system or device and complete a circuit while the moveable contact is in electrical contact with the fixed contacts.

The moveable contact 108 can comprise any suitable conductive material including any of the materials discussed herein regarding the fixed contacts 104, 106. Like the fixed contacts 104, 106, the moveable contact 108 can comprise a single continuous structure (as shown), or can comprise multiple component parts electrically connected to one another so as to serve as a contact bridge between the otherwise electrically isolated fixed contacts 104, 106, so that electricity can flow through the contactor device 100.

The moveable contact 108 can be configured such that it can move into and out of electrical contact with the fixed contacts 104, 106. This causes the circuit to be "closed" or completed when the moveable contact is in electrical contact with the fixed contacts 104, 106, and to be "open" or broken when the moveable contact 108 is not in electrical contact with the fixed contacts 104, 106. The fixed contacts 104, 106 are otherwise electrically isolated from one another when not contacting the moveable contact 108. In some embodiments, including the embodiment shown in FIG. 1, the moveable contact 108 is physically connected to a shaft structure 110, which is configured to move along a predetermined distance within the contactor device 100. The shaft 110 can comprise any material or shape suitable for its function as an internal moveable component that is physically connected to the moveable contact 108, such that the moveable contact 108 can move with the shaft 110.

Movement of the shaft 110 controls movement of the moveable contact 108, which in turn controls the position of the moveable contact 108 in relation to the fixed contacts 104, 106, which in turn controls flow of electricity through the contactor device 100 as described herein. Movement of the shaft can be controlled through various configurations, including, but not limited to, electrical and electronic, magnetic and solenoid, and manual. An example of manual configurations for controlling a shaft connected to a moveable contact are set forth in U.S. Pat. No. 9,013,254, to Gigavac, Inc., the assignee of the present application, and all of which is incorporated into the present application in its entirety by reference. Some of these example configurations of manual control features include magnetic configurations, diaphragm configurations and bellowed configurations.

In the embodiment shown in FIG. 1, movement of the shaft 110 is controlled using a solenoid configuration. A plunger structure 111 is connected to, or at least partially surrounds, a portion of the shaft 110. The body 102 also houses a solenoid 112. Many different solenoids can be used, with one example of a suitable solenoid being a solenoid operating under a low voltage and with a relatively high force. One example of a suitable solenoid is commercially available solenoid Model No. SD1564 N1200, from Bicron Inc., although many other solenoids can be used. In the embodiment shown, the plunger structure 111 can comprise a metallic material that can be moved and controlled by the solenoid 112. Movement of the plunger structure 111 controls movement of the connected shaft 110, which in turn controls movement of the connected moveable contact 108.

The travel distance of the shaft 110 can be controlled utilizing various features, for example, springs to control travel/overtravel distance or various portions of the body 102 that can block or restrict the travel distance of the shaft 110. In the embodiment shown in FIG. 1, the travel distance of the shaft 110 is partially controlled by a hard stop 113, which is configured to abut against a winged portion 114 of the shaft 110, to limit the distance of the shaft 110 when the shaft 110 has traveled a sufficient distance from the fixed contacts 104, 106. The hard stop 113 can comprise any material or shape suitable for providing a surface to interact with the shaft 110 to limit the movement or travel distance of the shaft 110. In the embodiment shown in FIG. 1, the hard stop 113 comprises a plastic material.

Different embodiments can comprise other features such as arc control magnets and pyrotechnic disconnect elements 202, 203 and 204 as set forth in U.S. Pat. No. 10,388,477 to Gigavac, Inc., the assignee of the present application, the contents of which is incorporated herein by reference.

Figure 2:
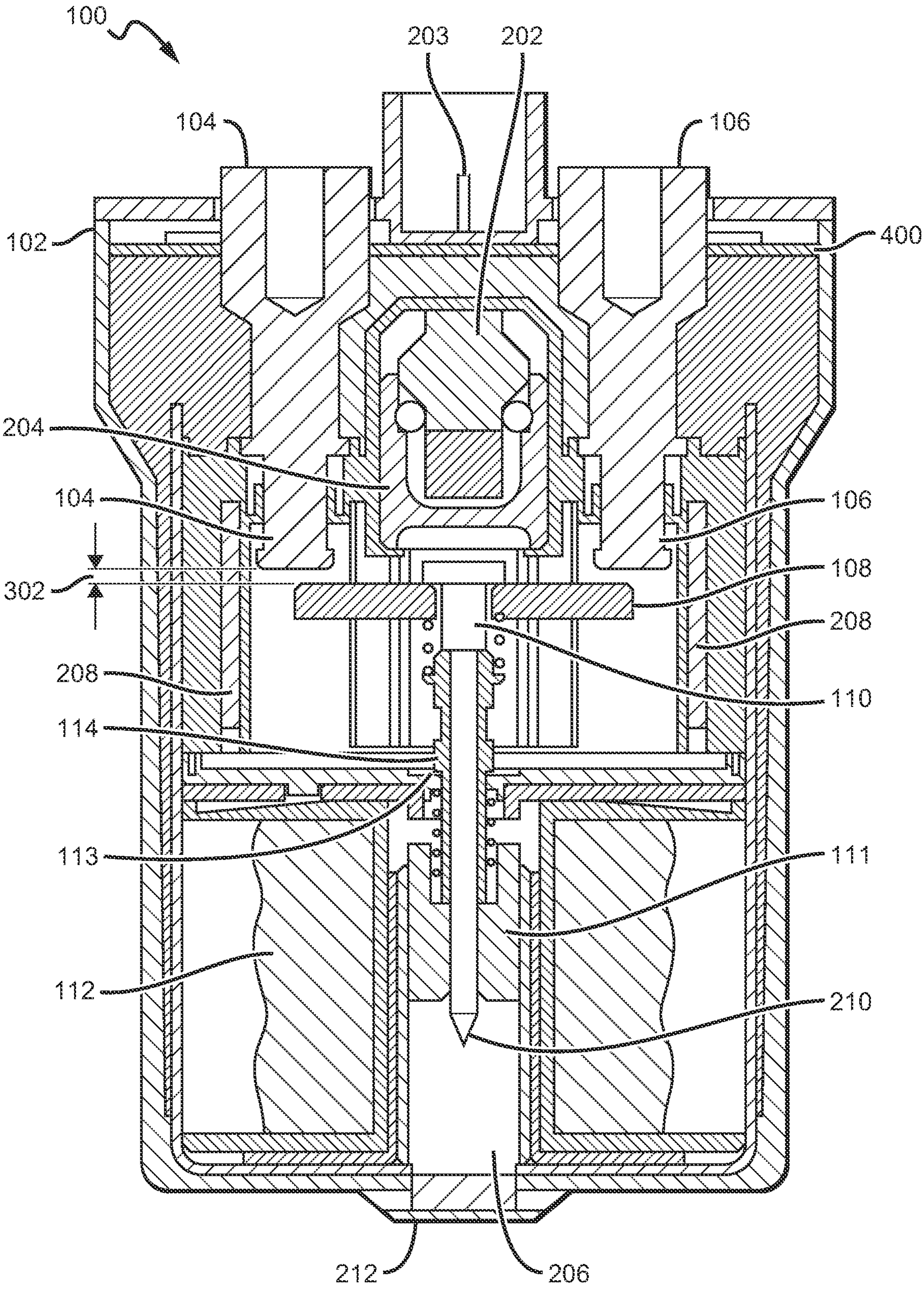
FIG. 2 is a front sectional view of the embodiment of the contactor device of FIG. 1, shown in an "open" or "disconnected" orientation that prevents flow of electricity through the device.

The contactor device 100 is shown in its "open" state in FIG. 2, which shows the shaft 110 moved such that the connected moveable contact 108 is separated from the fixed contacts 104, 106 by a disconnection spatial gap 302. The disconnection spatial gap 302 causes the moveable contact 108 to be spaced a sufficient distance from the fixed contacts 104, 106, which are otherwise electrically isolated from one another, to interrupt flow of electricity through the device.

Figure 3:
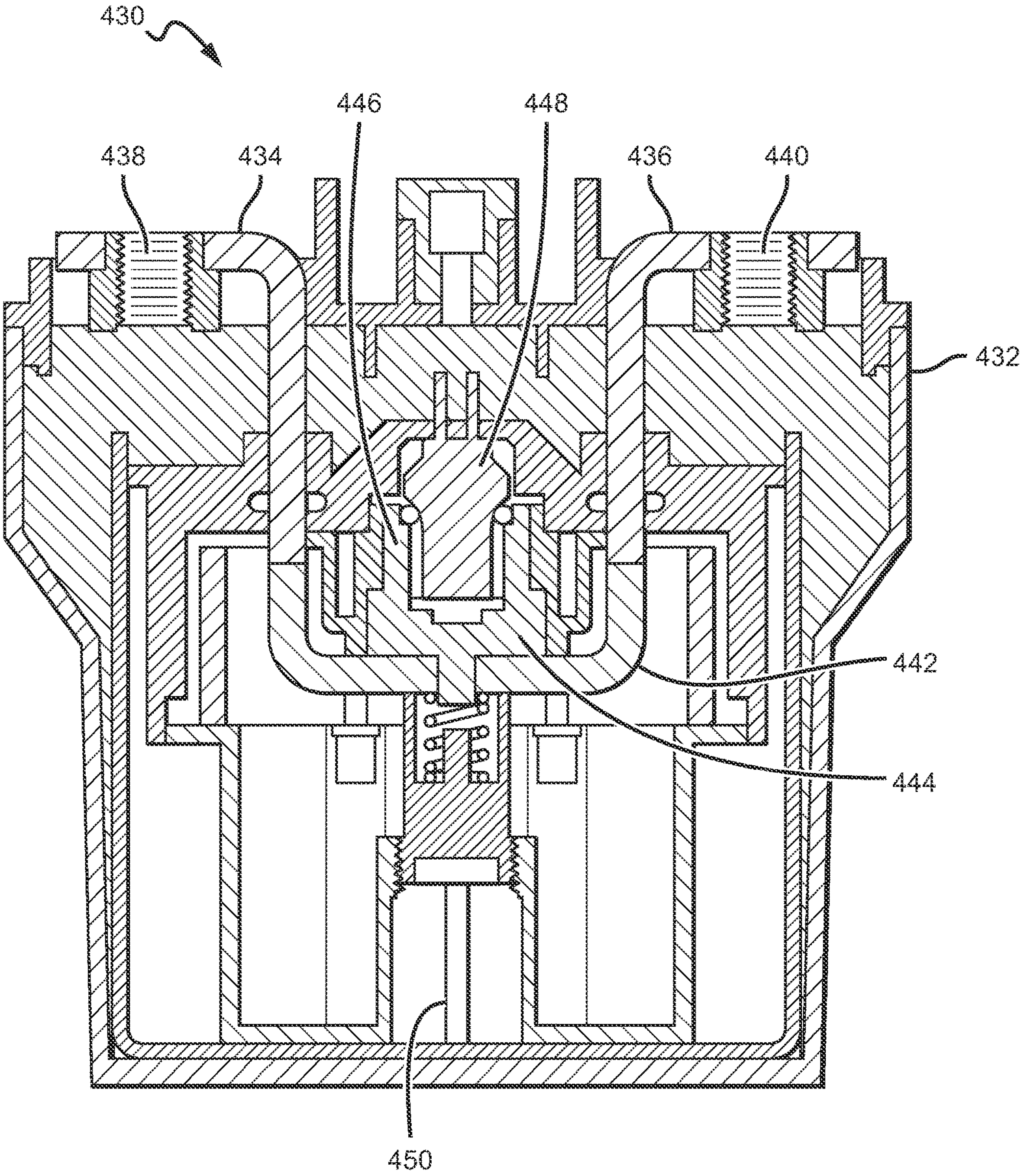
FIG. 3 is a front sectional view of a fuse device capable of incorporating the pressure relief mechanisms according to the present invention.
Figure 4:
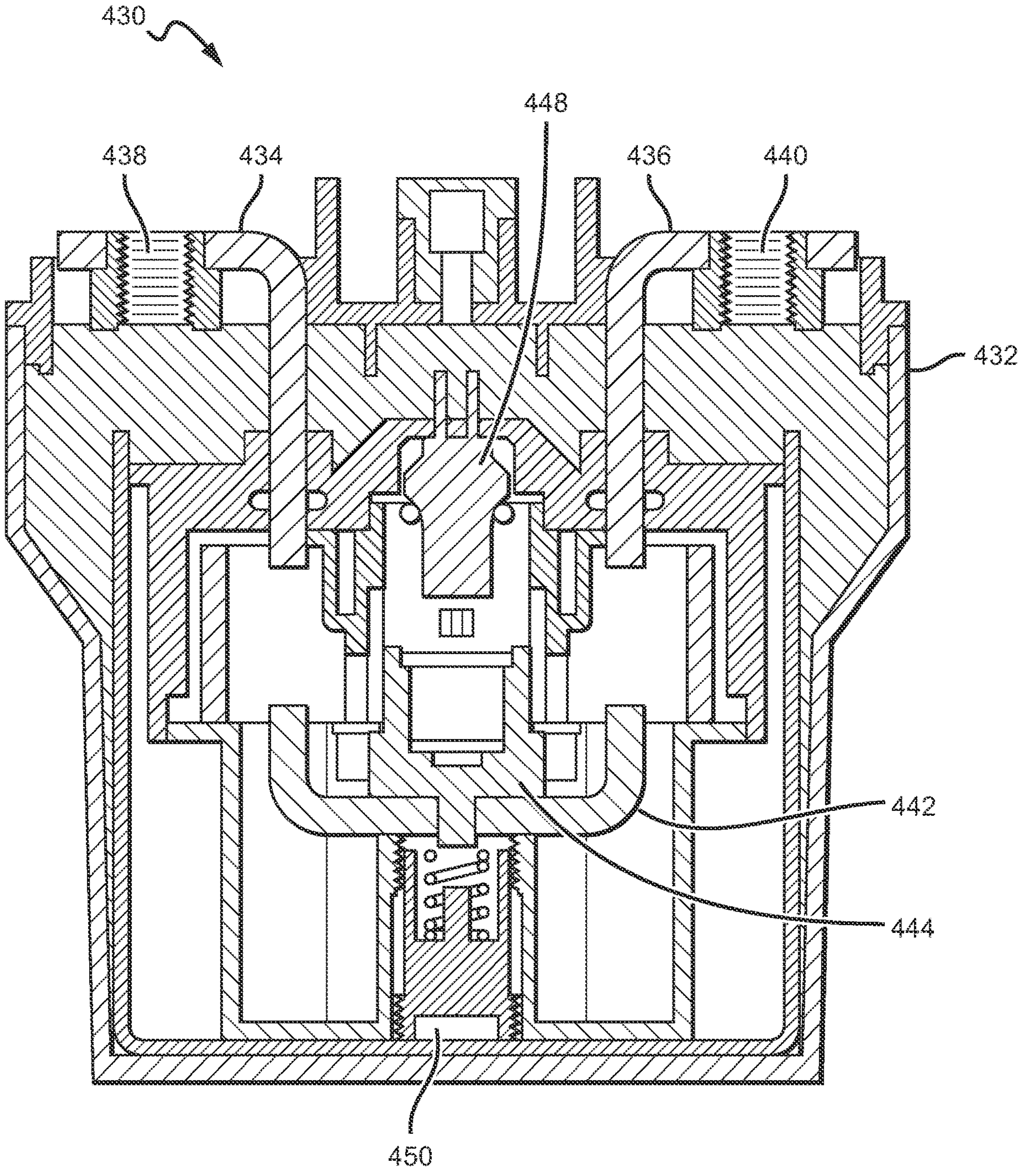
FIG. 4 is a front sectional view of the embodiment of the fuse device of FIG. 1, shown in "open" or "disconnect" orientation.

Aside from contactor devices, which can operate to restrict or allow electrical flow through the device during ordinary operation, another type of switching device that can serve as an example environment for use pressure relief mechanisms according to the present invention are fuse devices. Fuse devices only allow electrical flow through the device during ordinary operation and function as a sacrificial circuit break when a threshold current level passes through the device. FIGS. 3 and 4 show such an example fuse device 430, which comprises similar features, and operates similarly to the contactor device 100, in FIGS. 1 and 2, however, without comprising some of the features, such as a solenoid or other mechanism for opening and closing the fixed and moveable contacts.

During ordinary operation, the fuse device 430 is constantly in a "closed" state allowing current flow through the device, until open features are activated, resulting in the device being in an "open" state thereafter, preventing current flow through the device. FIGS. 3 and 4 show a body 432 (similar to the body 102 in FIGS. 1-3 above), fixed contacts 434, 436 (similar to fixed contacts 104, 106 in FIGS. 1 and 2 above). However, in this embodiment, the fixed contacts 434, 436 are formed separately from the power terminals 438, 440, which are electrically connected to the fixed contacts 434, 436 for connection to external circuitry, the power terminals and fixed contacts being one-in-the-same in the embodiment of FIGS. 1 and 2. FIGS. 3 and 4 further show moveable contacts 442 (similar to moveable contact 108 in FIGS. 1 and 2 above), a shaft structure 444 (similar to the shaft structure 110 in FIGS. 1-3 above, except shaped differently).

Figure 5:
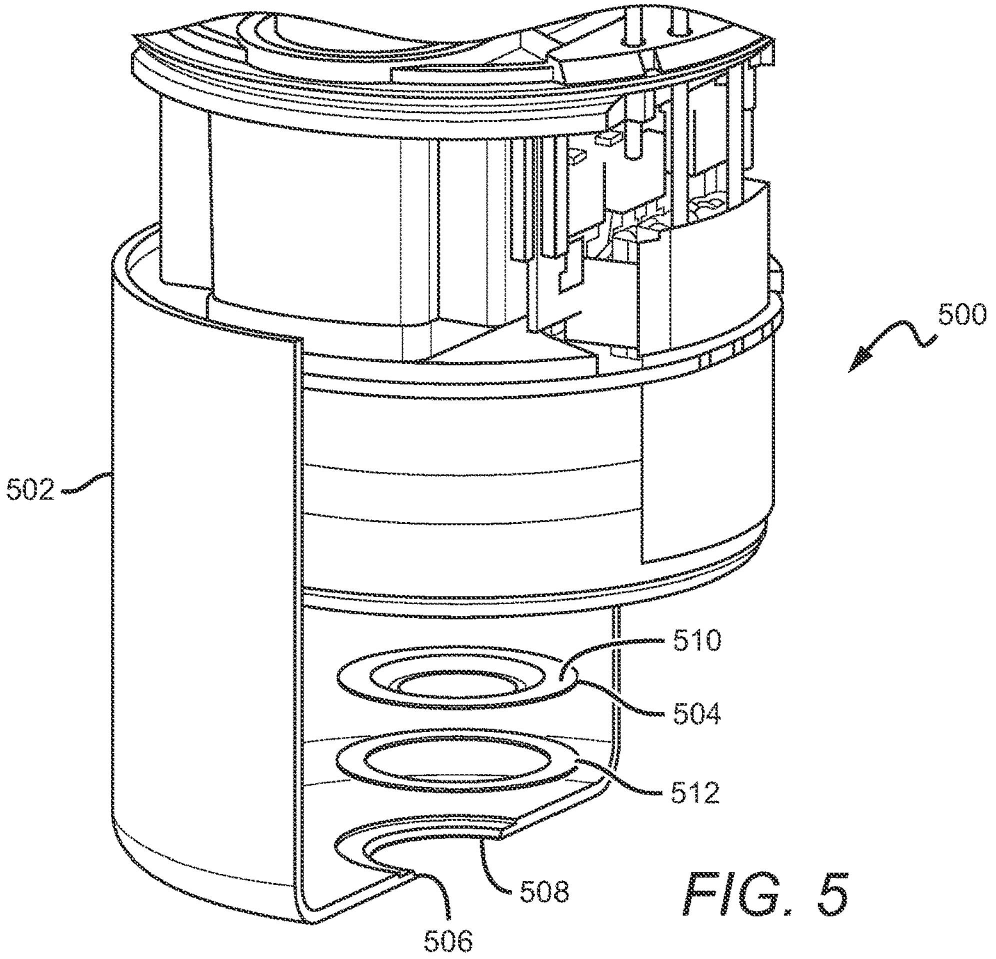
FIGS. 5 is a perspective view of one embodiment of a contactor according to the present invention having a rupture disk pressure relief mechanism.
Figure 6:
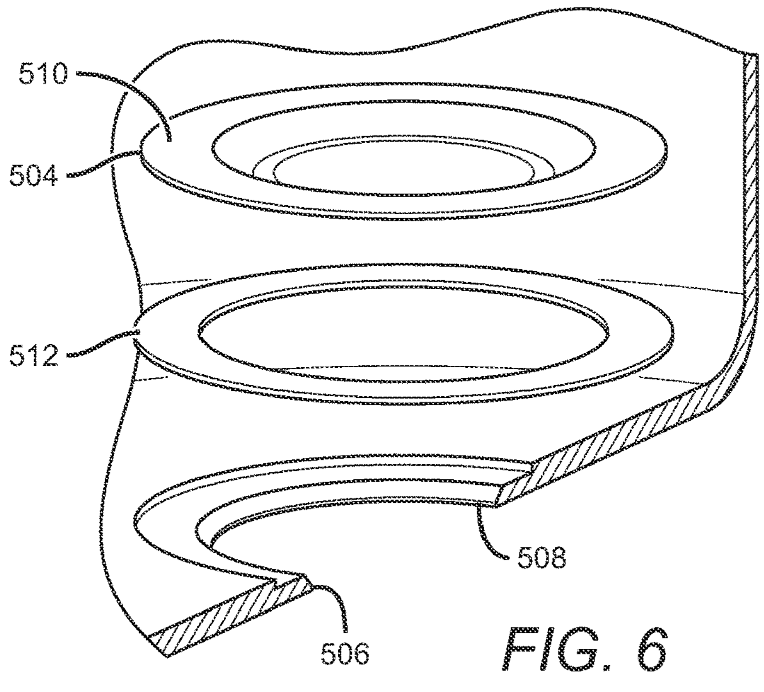
FIG. 6 is a detailed perspective view of the rupture disk pressure relief mechanism shown in the contactor of FIG. 5.
Figure 7:
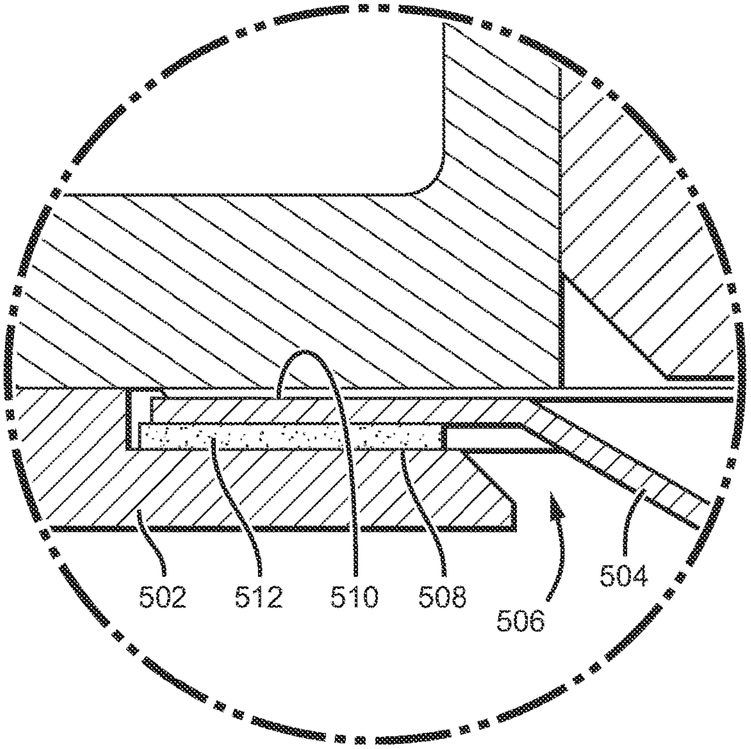
FIG. 7 is a sectional view of the rupture disk mechanism shown in the contactor of FIG. 5.
Figure 8:
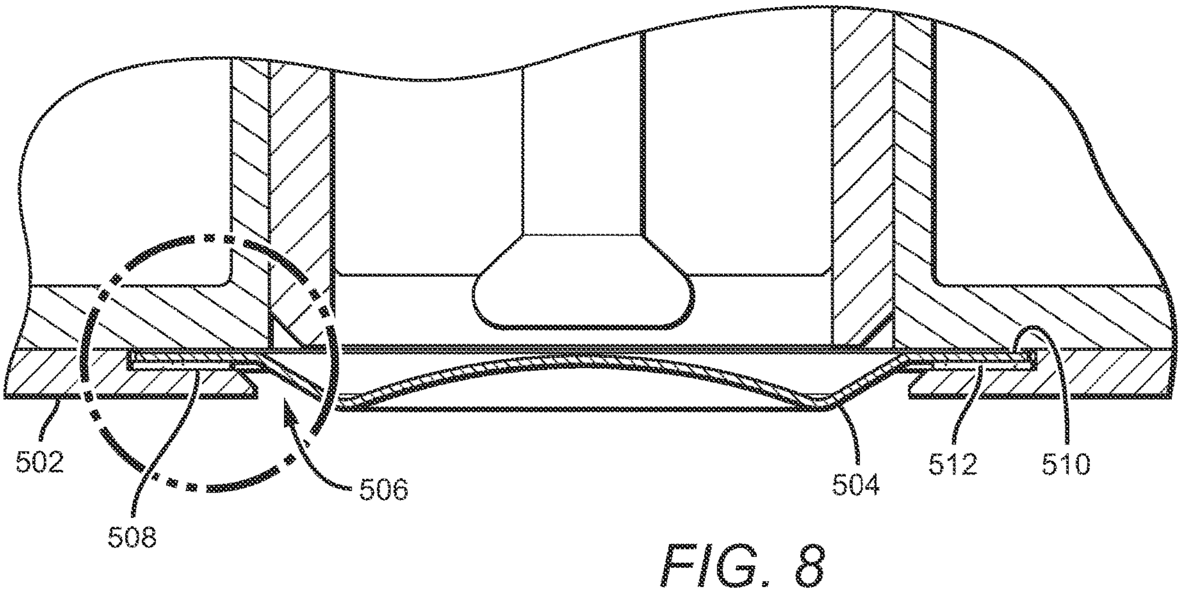
FIG. 8 is another sectional view of the rupture disk mechanism shown in the contactor of FIG. 5.

The shaft structure 444 is connected to the moveable contact 442 and the piston structure 446 (which is similar to the piston structure 204 in FIGS. 1-3 above). The contacts can be separated in many ways and in the embodiment shown, the piston structure 446 can at least partially surround a pyrotechnic charge 448. When the pyrotechnic charge 448 is activated, the moveable contact 442 and the piston structure 446 are forced in a direction away from the fixed contacts 434, 436, therefore breaking the circuits. In some embodiments, the fuse device 430 can comprise a support structure 450 configured to help hold the fixed contacts 434, 436 and the moveable contacts 442 in place. In some embodiments, triggering of the pyrotechnic charge 448 causes the piston structure 446 to be driven away from the pyrotechnic charge with such force that the support structure 450 is broken or displaced. In some embodiments, the fuse device 430 can be triggered by active signals. In some embodiments, the fuse device 430 can be triggered by passive triggering configurations, such as those discussed herein. FIG. 4 shows the fuse device 430 in its "closed" state, wherein the fixed contacts 434, 436 and the moveable contacts 442 are together and electrical flow through the device 430 is permitted. In contrast, FIG. 5 shows the fuse device 430 in its "open" state after triggering of the pyrotechnic charge 448, wherein the fixed contacts 434, 436 and the moveable contacts 444 are separated and electrical flow through the device 430 is prevented.

In embodiments according to the present invention, a pressure relief mechanism can be included to safely provide relief of pressure build-up on the contactor or fuse during operation. The following description is in relation to a contactor, but it is understood that the embodiments of the present invention can also be used in other switching devices such as fuses.

Referring again to FIG. 1, during operation of a switching device such as a contactor 100, arcing can occur during the separation of the movable contact 108 and the fixed contact 104, 106. If this separation occurs when elevated current levels are passing through the fixed movable contact 108 and fixed contacts 104, 106 increased arching can occur that can result in a build-up of pressure within the contactor. If this pressure build-up is high enough the housing 102 can fail, resulting in a breach or rupturing of the housing 102.

FIGS. 5-8 show one embodiment of a contactor 500 having a housing 502 like the housing 102 described above. The housing can be made of the same or similar materials to housing 102 and can be arranged with the same features. The housing 502 can comprise a pressure relief mechanism arranged to prevent breach or rupture of the housing 502 during arcing. In some embodiments, the pressure relief mechanism can comprise a rupture disk 504 that can be arranged in many different locations on the contactor 500. In the embodiment shown the rupture disk is in the housing 502, such as in the floor of the housing 502.

The floor of the housing 502 can comprise a rupture disk hole 506 that is sized to hold the rupture disk 504. The hole 506 can comprise an offset or counterbore 508 around its edge and the rupture disk 504 can comprise a flange 510 that is sized to sit in the offset 508. It is understood that in other embodiments the hole 506 may not have an offset or counterbore and in these embodiments the flange can sit directly on the surface of the housing 502 around the hole 506.

The rupture disk 504 is sized to fit closely with the hole 506 and is coupled to the hole such that a hermetic seal is created between the rupture disk 504 and hole 506, such that during operation the hermetic seal of the housing 502 is maintained. In the embodiment shown, a strong epoxy 512 is included around the offset 508 such that the epoxy 512 is arranged between the flange 510 and the offset 508. Enough epoxy is used with sufficient adhesion to cause a robust air-tight seal between the flange 510 and the offset 508. The offset 508 provides the further advantage of lowering the flange 510 so that the top of the flange 510 is at the same, or substantially the same, height as the inside bottom surface of the housing. This allows for the rupture disk to sit lower such that it is not in the space provided by the housing, such that the internal components of the contact 500 can sit close to the floor of the housing 502.

The contactor 500 can comprise fixed contacts and a movable contact (not shown) that can be arranged like the fixed contacts 104, 106 and the movable contact 108 described above. These elements are generally located in the top portion of the housing 502 and the rupture disk 504 is located at the bottom of the housing 502. During an arcing event, the pressure is generated at the contacts in the top portion of the housing, and for the rupture disk to operate this pressure at the top of the housing must transfer to the bottom of the housing. In some embodiments, this pressure can simply pass by the internal components of the contactor 500 to reach the rupture disk 504. In other embodiments, dedicated paths can be included in the contactor 500 to allow the pressure to pass. This can include holes, slots or paths formed in different location in the contactor internal components or the housing to allow for the pressure to more freely pass from the top portion to the rupture disk 504.

The rupture disk can comprise many different sizes, shapes and materials. In the embodiment shown, the rupture disk is made from a metal material, such as aluminum, steel or nickel, but it is understood that other materials or combinations of materials can be used such as those used for the body 502 as described above. The rupture disk can also comprise non-metal materials such as different types of plastics.

The rupture disk 504 can comprise different types, such as a "reverse buckling" or "forward-acting" rupture disk, with a suitable rupture disk as shown being a reverse buckling type. The rupture disk can be many different thicknesses, with the embodiment shown having a thickness in the range of 0.005 to 0.0015 inches thick. In one embodiment, the rupture disk can have a thickness of approximately 0.007 inches.

As described above, the rupture disk hole 506 can be sized to hold the rupture disk 504 and can have many different shapes and sizes. In some embodiments the rupture disk hole 506 can be up to 2 inches or more in diameter, depending on the size of the contactor and its housing. Some can have a diameter of approximately 0.530 inches and a 0.675 inch diameter offset or counterbore. The different sizes and thickness of the rupture disks can provide for rupture at different rupture pressures such as 80, 100, 200, 300 or higher PSI.

During the increased pressure of an arcing event, the pressure passes from the upper portion of the housing 502 to the lower portion where the rupture disk 504 is located. In some embodiments, the rupture disk 504 can rupture to provide an opening in the rupture disk 504 to allow air to pass. In other embodiments, the rupture disk 504 can be displaced from the rupture disk hole to allow air to pass.

Figure 9:
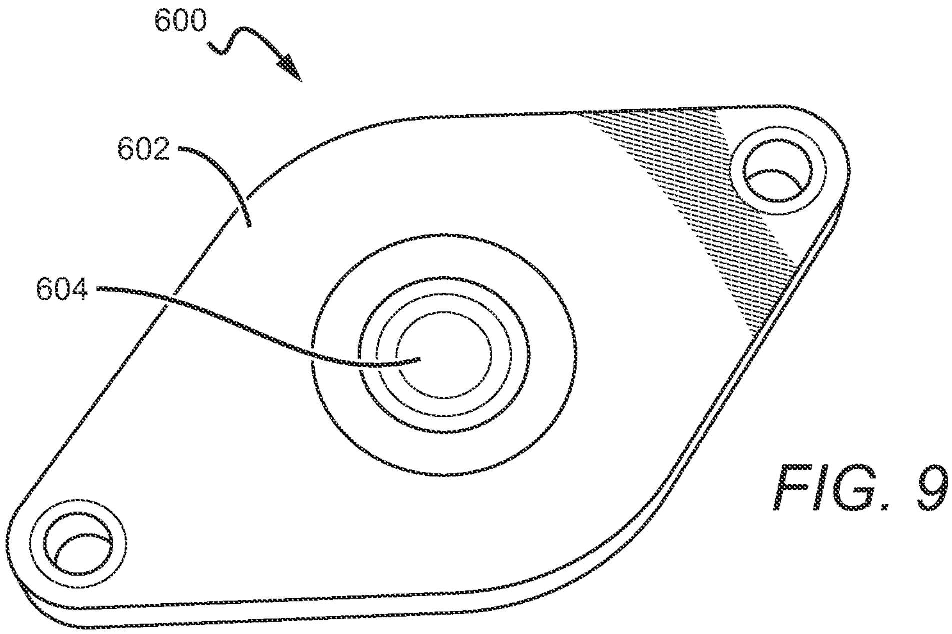
FIG. 9 is a bottom view of a contactor according to the present invention having a rupture disk pressure relief mechanism.
Figure 10:
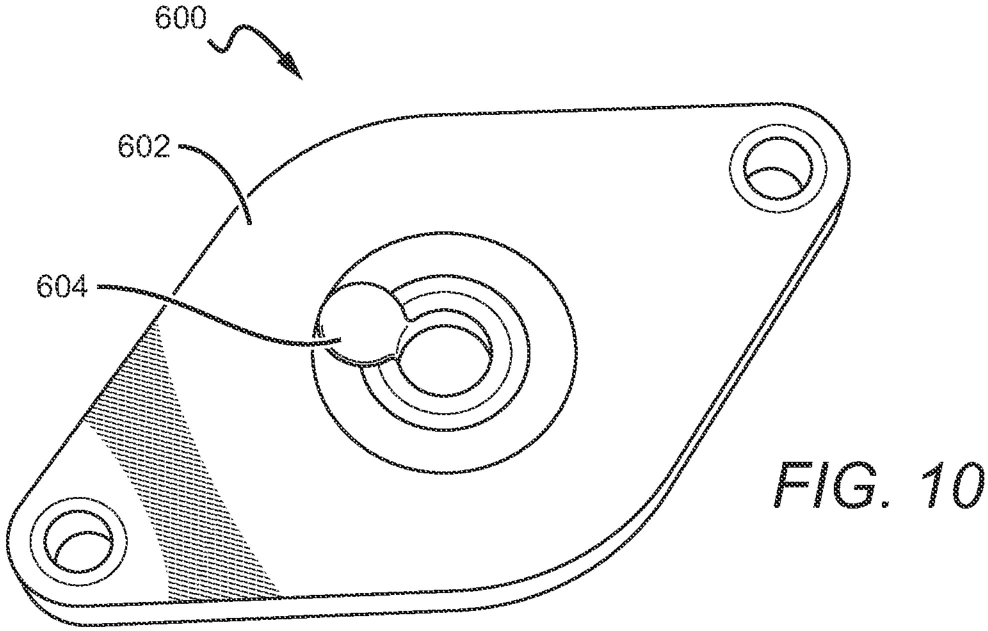
FIG. 10 is a bottom view of the contactor in FIG. 8 following rupture of the rupture disk mechanism.
Figure 11:
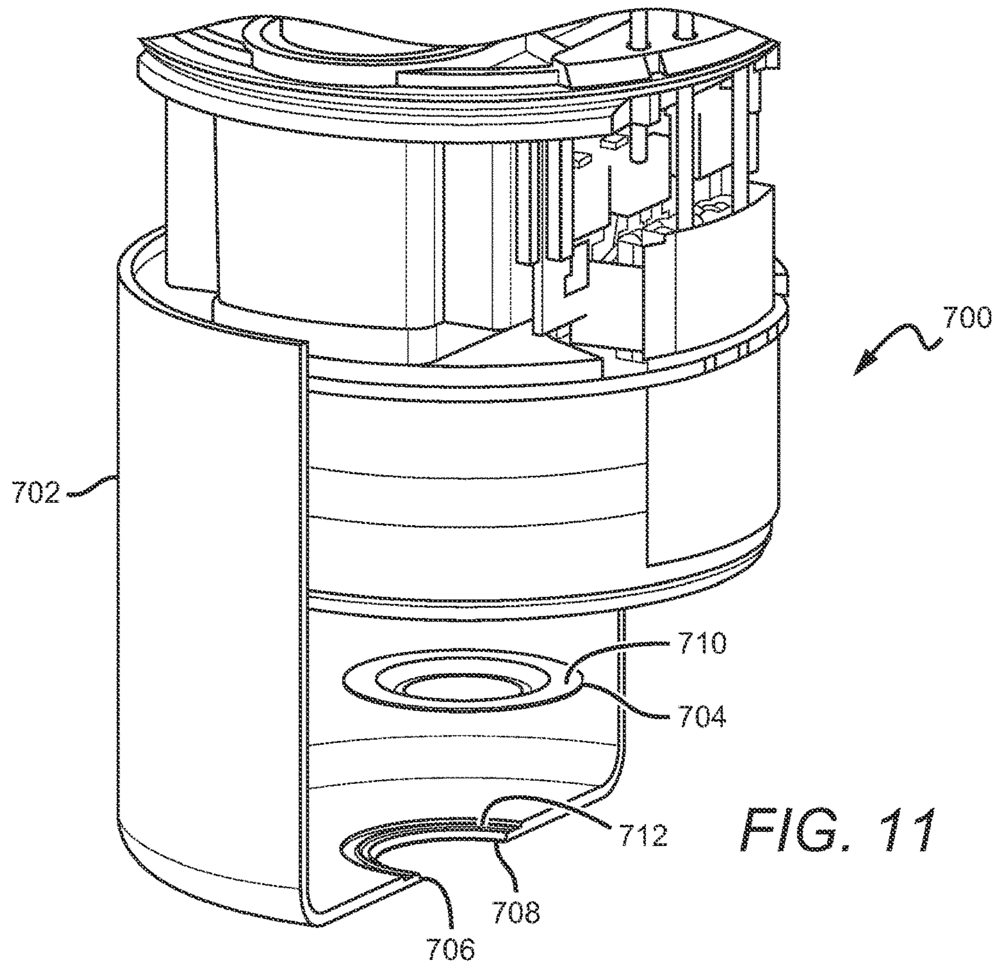
FIG. 11 is a perspective view of one embodiment of a contactor according to the present invention having a rupture disk pressure relief mechanism.
Figure 12:
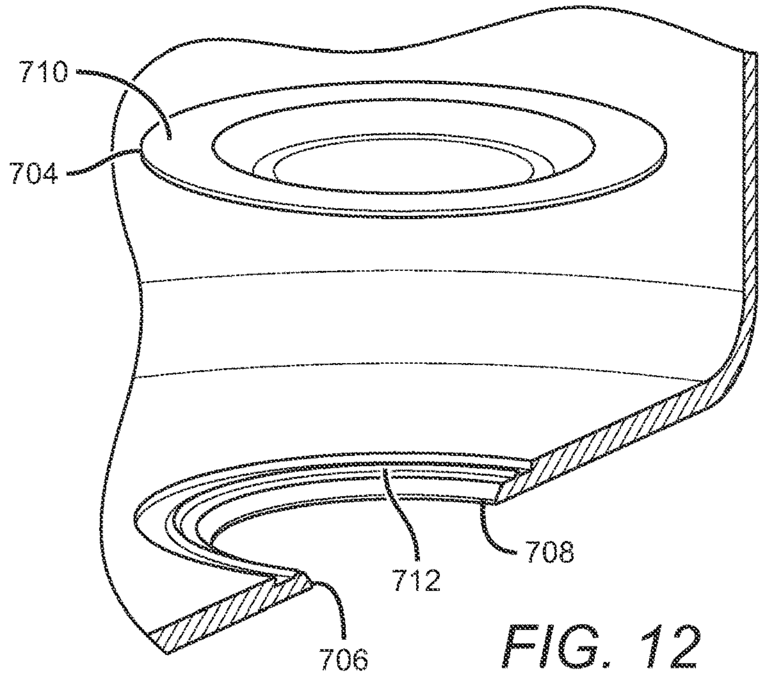
FIG. 12 is a detailed perspective view of the rupture disk pressure relief mechanism shown in the contactor of FIG. 10.
Figure 13:
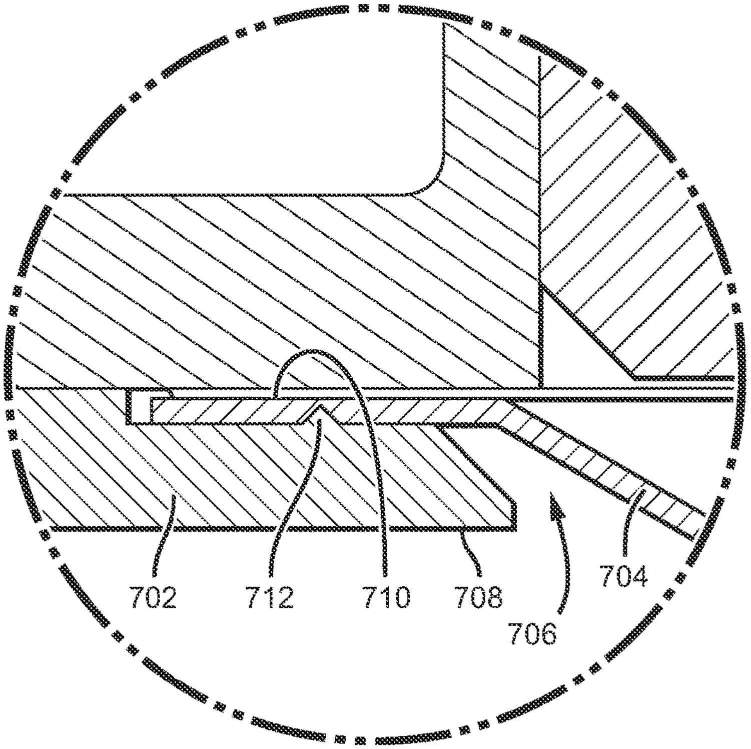
FIG. 13 is a sectional view of the rupture disk mechanism shown in the contactor of FIG. 10.
Figure 14:
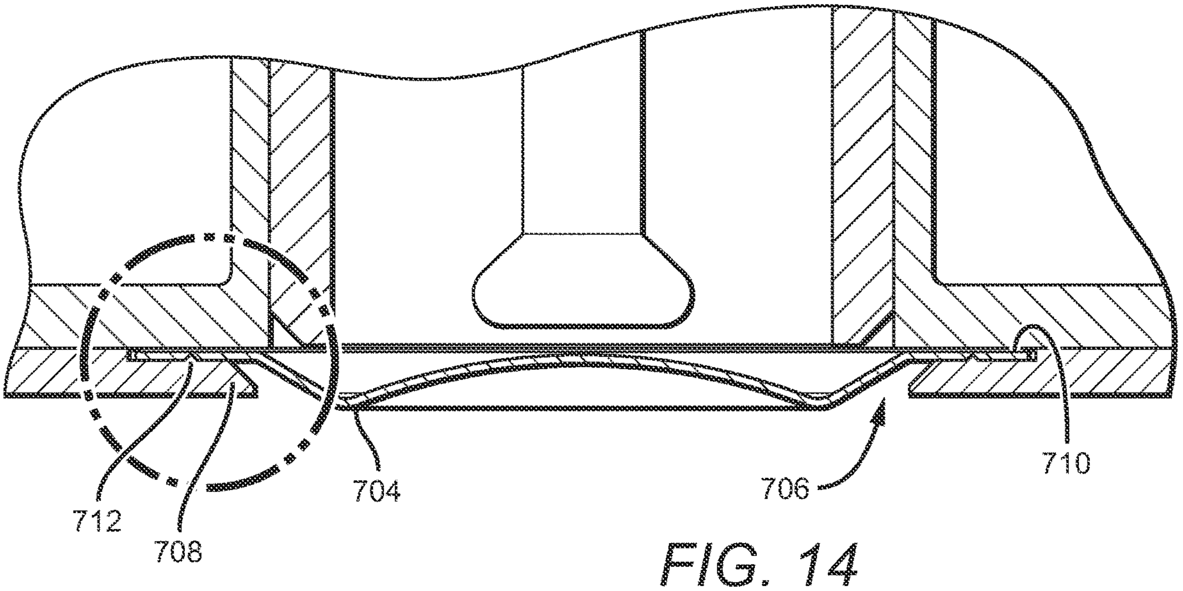
FIG. 14 is another sectional view of the rupture disk mechanism shown in the contactor of FIG. 10.

FIGS. 9 and 10 show one embodiment of a contactor 600 with a housing 602 and a rupture disk 604 and a rupture disk hole 606. In FIG.9, the rupture disk 604 is seated in the rupture disk hole 606 for normal operation, with the rupture disk 604 forming an air-tight hermetic seal with the rupture disk hole 606. This allows for the contactor housing 602 to maintain a hermetic seal around the contactor's internal components. FIG. 10 shows the contactor 600 following a high-pressure arcing event wherein the pressure from the arcing caused the rupture disk 604 to be forced from the rupture disk hole 606. This allows the high pressure to pass from the housing 602 through the rupture disk hole 606 before the housing 602 is breached by the pressure of the arcing event.

In the embodiment shown in FIGS. 9 and 10 the hermetic seal of the housing 602 will be lost due to the rupture disk 604 being out of the rupture disk hole 606. In some embodiments, the contactor 600 may still be functional, although its performance may be limited or reduced by the lack of hermetic seal and the release of internal gasses or vacuum in the housing 602. For example, the contact resistance within the housing may increase, the contactor may not be able to carry its rated current and the contactor's isolation performance may be reduced. Still in other embodiments, the contactor's performance may still be acceptable following the high-pressure arcing event.

It is understood that the rupture disks according to the present invention can be arranged in many ways according to the present invention. FIGS. 11-14 show another embodiment of a contactor 700 having a housing 702, a rupture disk 704 arranged in a rupture disk hole 706. These components can be arranged in the same or similar manner to the components described above for contactor 500 and can be made of the same or similar material. In contactor 700, however, the rupture disk 704 is welded to the rupture disk hole 706. The rupture disk hole 706 can comprise a counter bore or offset 708 and the rupture disk 704 can comprise a flange 710 as described above. In this embodiment, the surface of the offset 708 can comprise a weld projection 712. In other embodiments, the weld projection 712 can be on the flange 710. The weld projection 712 is used to weld the flange to the offset to provide an air-tight seal between the two. Many different welding methods can be used such as resistance or laser welding, and the resulting rupture disk 504 can function as described above by rupturing or being removed from the rupture disk hole 506 to allow pressure to pass.

Figure 15:
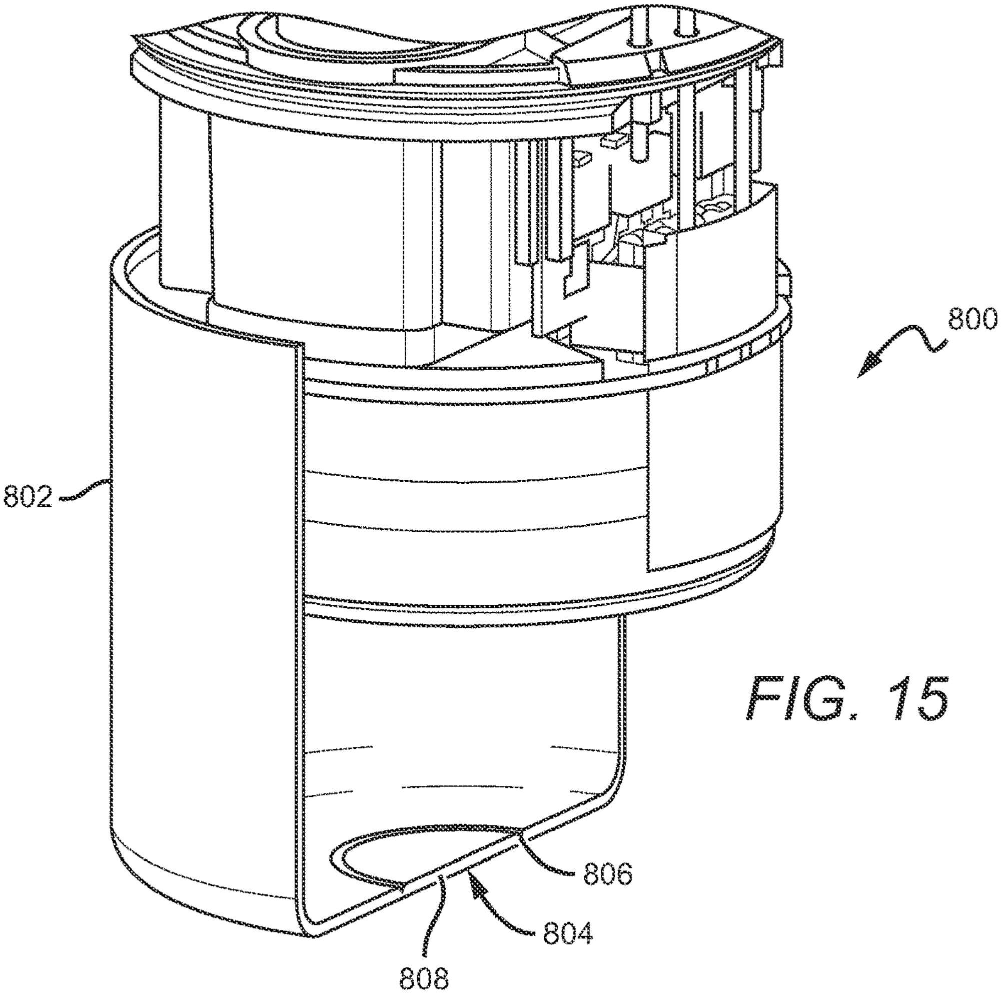
FIG. 15 is a perspective view of one embodiment of a contactor according to the present invention having a weak point pressure relief mechanism.
Figure 16:
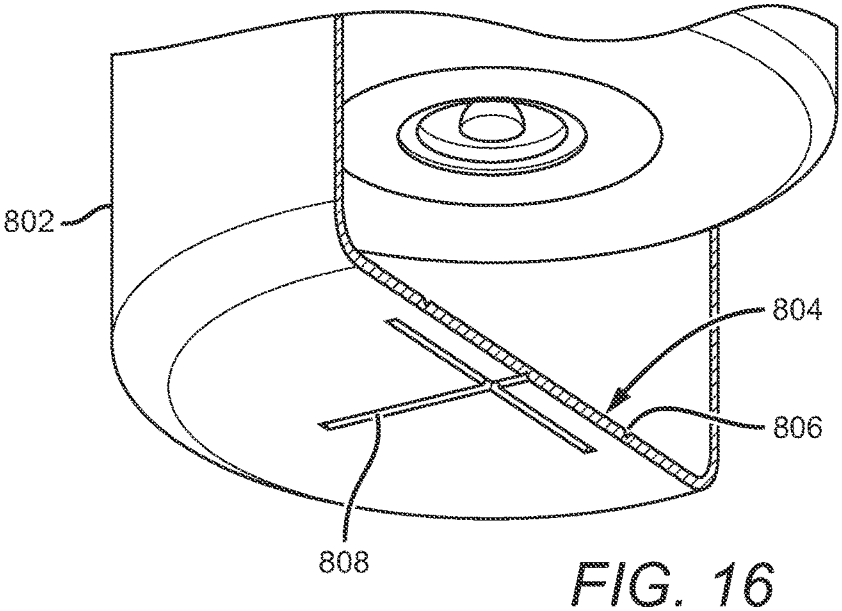
FIG. 16 is a detailed perspective view of the pressure relief mechanism shown in the contactor of FIG. 14.
Figure 17:
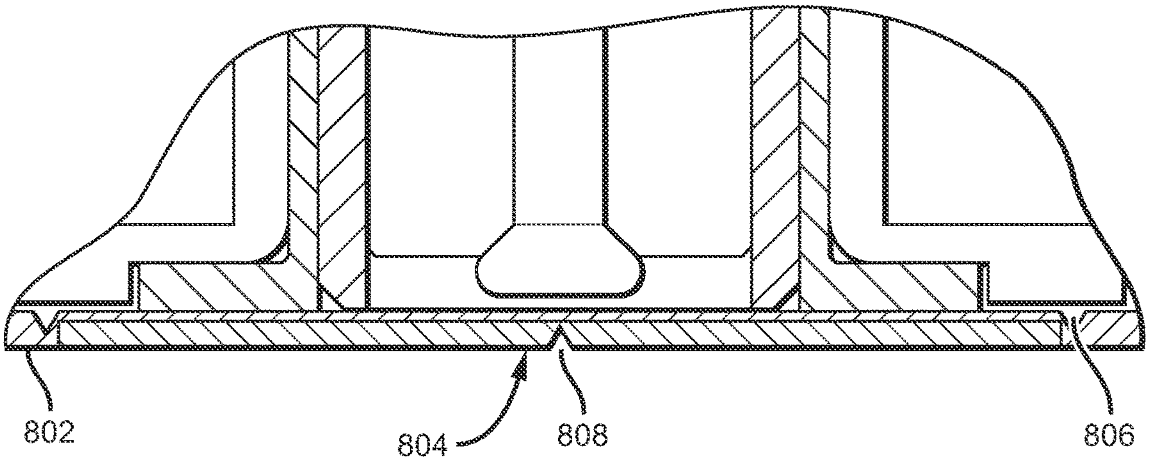
FIG. 17 is a sectional view of the rupture disk mechanism shown in the contactor of FIG. 10.
Figure 19:
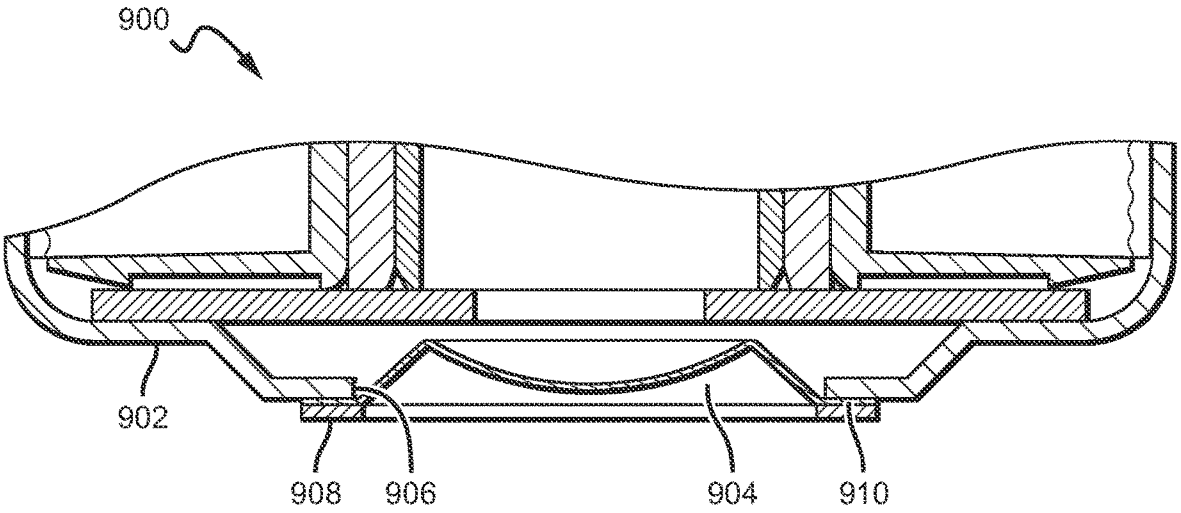
FIG. 19 is another sectional view of the contactor shown in FIG. 18.
Figure 18:
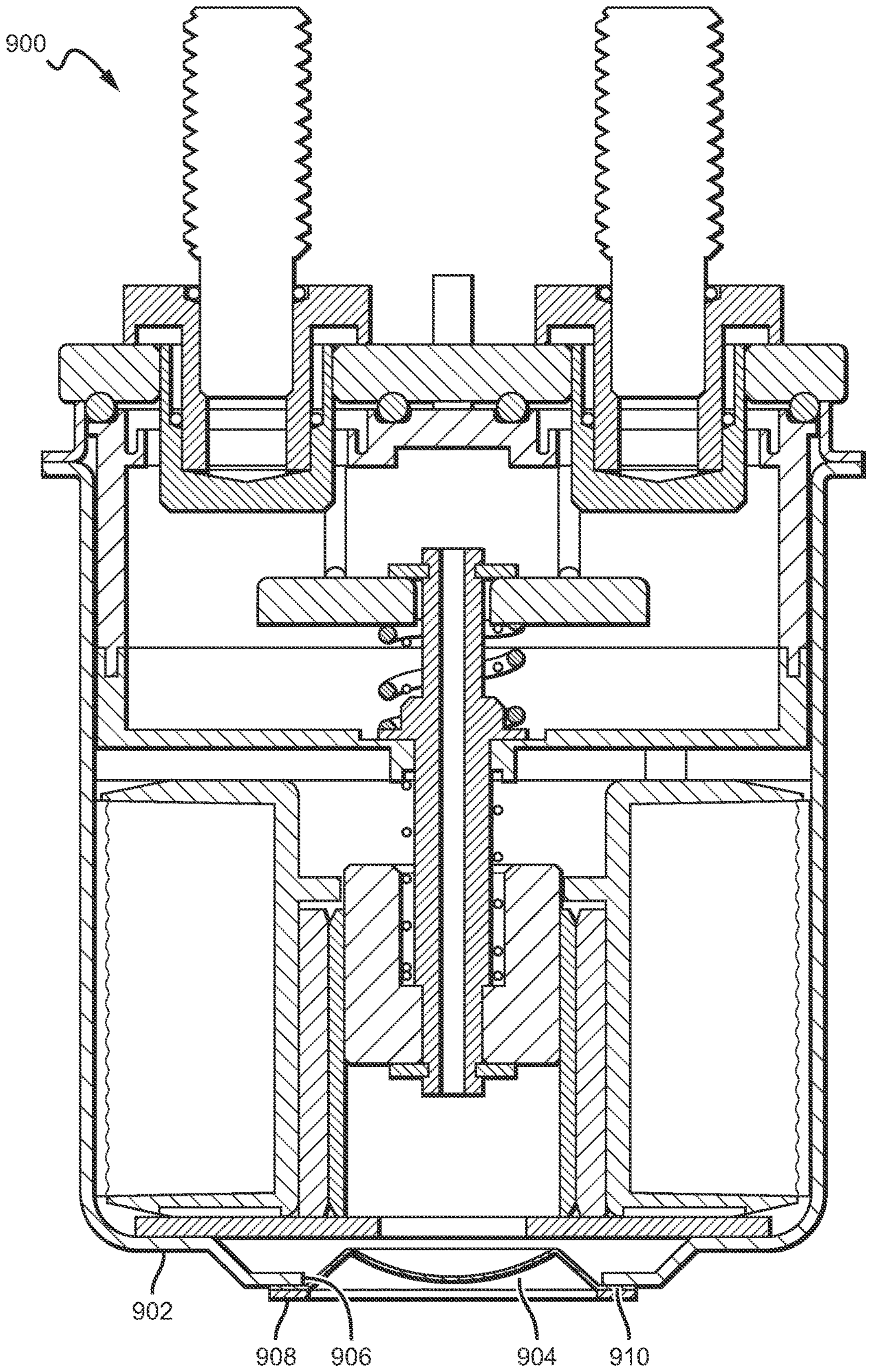
FIG. 18 is a sectional view of one embodiment of a contactor having a rupture disk according to the present invention.
Figure 20:
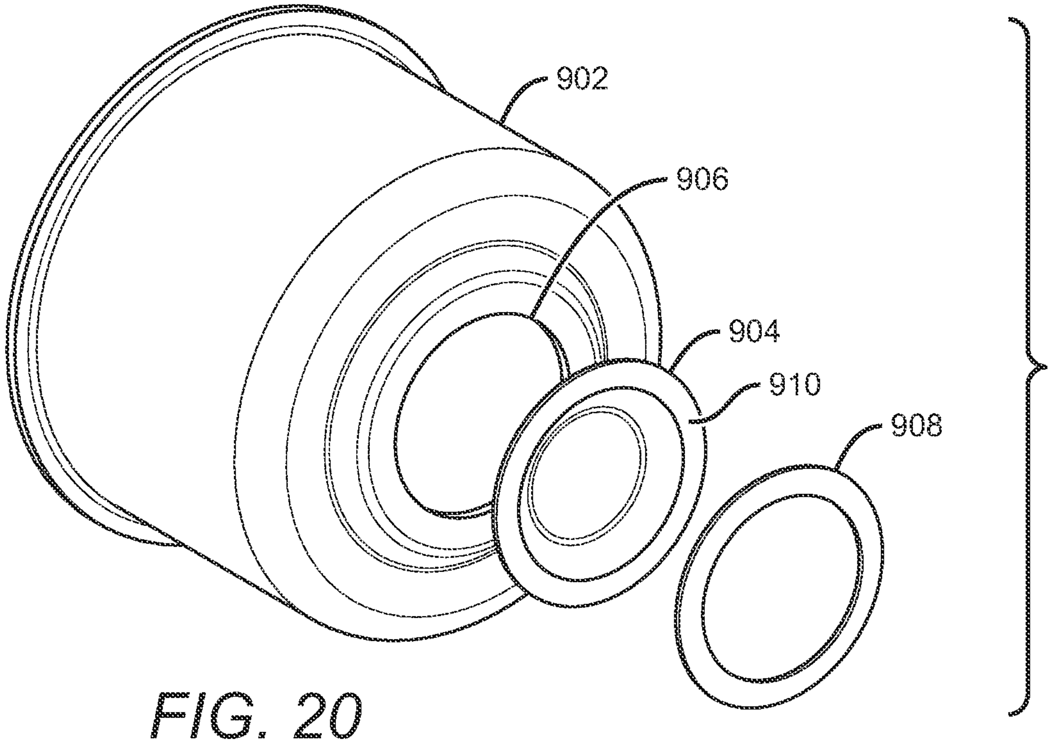
FIG. 20 is an exploded view of the housing used in the contactor shown in FIG. 18.
Figure 21:
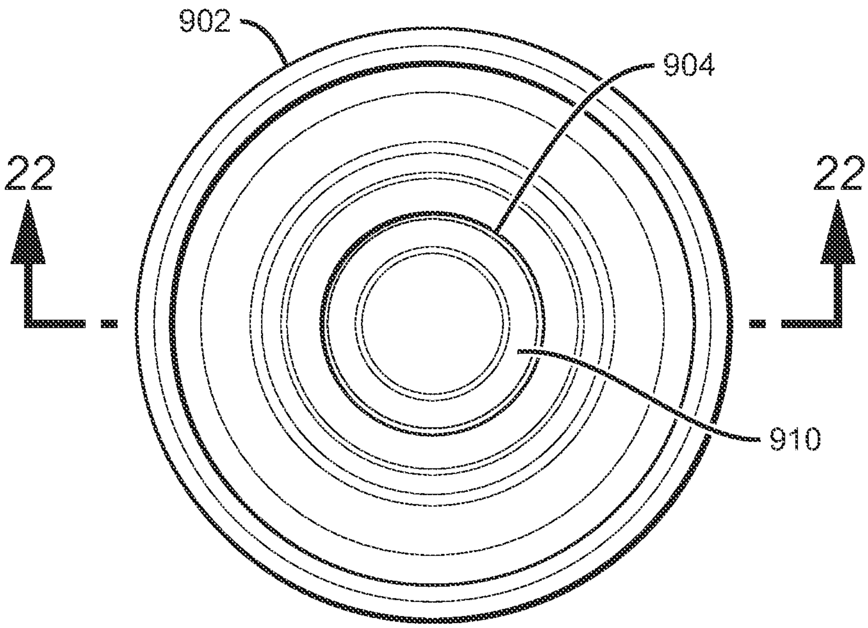
FIG. 21 is bottom view of the housing used in the contactor shown in FIG. 18.
Figure 22:
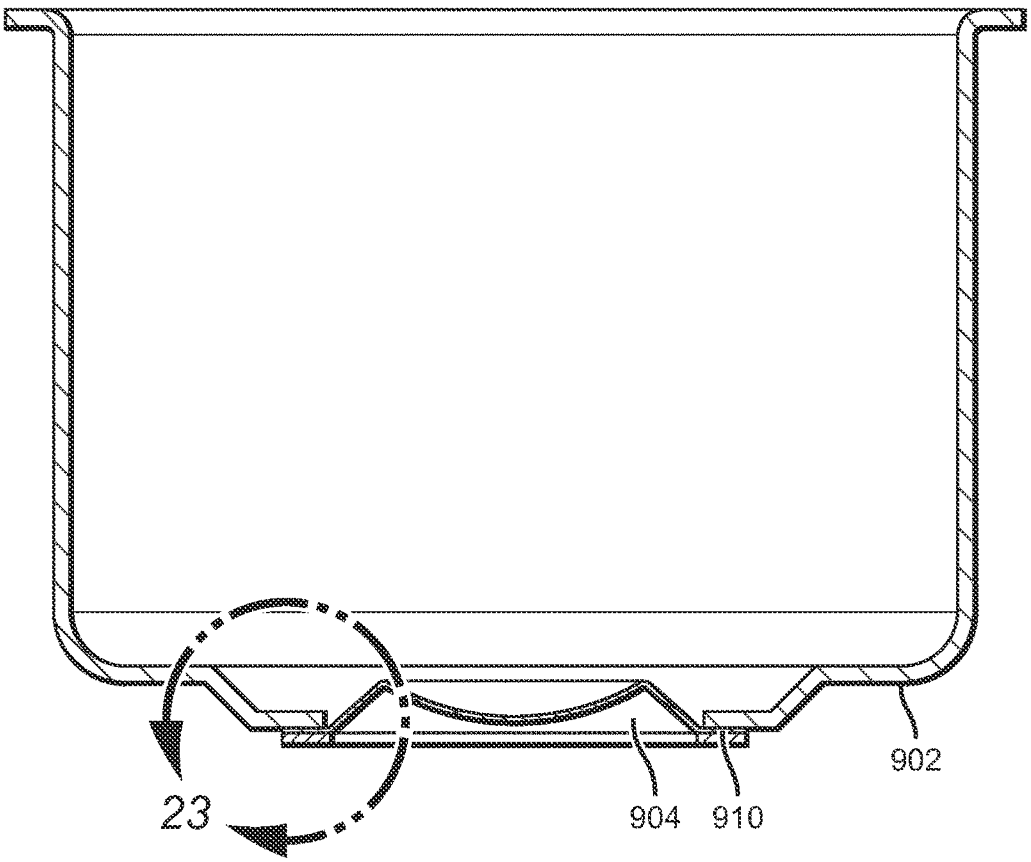
FIG. 22 is a sectional view of the housing used in the contactor shown in FIG. 10 taken along section lines B-B in FIG. 21.
Figure 23:
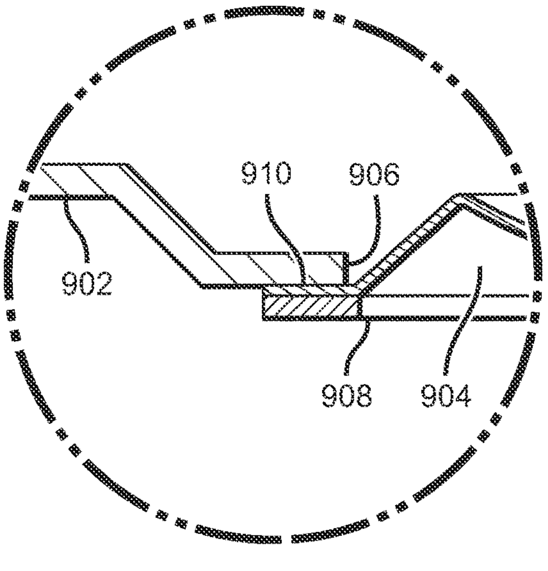
FIG. 23 is a detailed view of the housing and rupture disk used in the contactor shown in FIG. 18.

It is understood that other pressure relief mechanism can be used beyond the rupture disk arrangements described above. FIGS. 15-17 show another embodiment of a contactor 800 according to the present invention having a housing 802 that is the same or similar to the contactor housings described above. In this embodiment, however, instead of having a rupture disk, the housing comprises a machined, stamped or scored weak point 804 in the surface of the housing. The weak point 804 can be in many different locations and in the embodiment shown is in the bottom surface of the housing 802. The weak points comprise a top score 806 in the top surface of the bottom portion of the housing 812 and a bottom score 808 in the bottom surface of the bottom portion of the housing 802. The weak point 804 can be engineered to open or rupture at the desired internal pressure within the housing 802. During a high-pressure arcing event within the housing 802, the weak point 804 can open to allow the high pressure to escape through the weak point opening.

It is understood that the rupture disks according to the present invention can have many different shapes and sizes and can be mounted to a housing in many ways. FIGS. 18-23 show another embodiment of a contactor 900 and contactor housing 902 having a rupture disk 904 that is similar to the rupture disks shown in FIGS. 5-14 and described above. The housing has a rupture disk hole 906 and the rupture disk 904 comprises a flange 910 that is positioned on the housing 902 around the hole 906. Unlike the embodiments above however, the flange 910 is positioned on the outside surface of the housing 902 instead of the inside surfaces of housing 902.

The rupture disk 904 can be mounted to the housing 902 using many different methods and materials. For the contactor 900 the rupture disk can be welded to the housing using different methods and materials. In the embodiment shown, a weld ring 908 can be included that is positioned on the flange 910 with the flange 910 sandwiched between the weld ring 908 and the outside surface of the housing 902 around the hole 906. The weld ring 908 welds the flange 910 to the outside surface of the housing 902 around the hole 902, with the embodiment shown providing a hermetic seal between the rupture disk 904 and housing 902.

It is understood that in other embodiments the weld disk can be arranged in different ways and in different locations to mount the rupture disk to the housing. For example, in some alternative embodiments the weld disk can be arranged between the flange and the outer surface of housing. In still other embodiments the flange can be on the inside surface of the housing around the rupture disk hole and the weld ring can either be on the flange or between the flange and housing. In still other embodiments, more than one weld ring can be used with the weld rings arranged in different locations.

Figure 24:
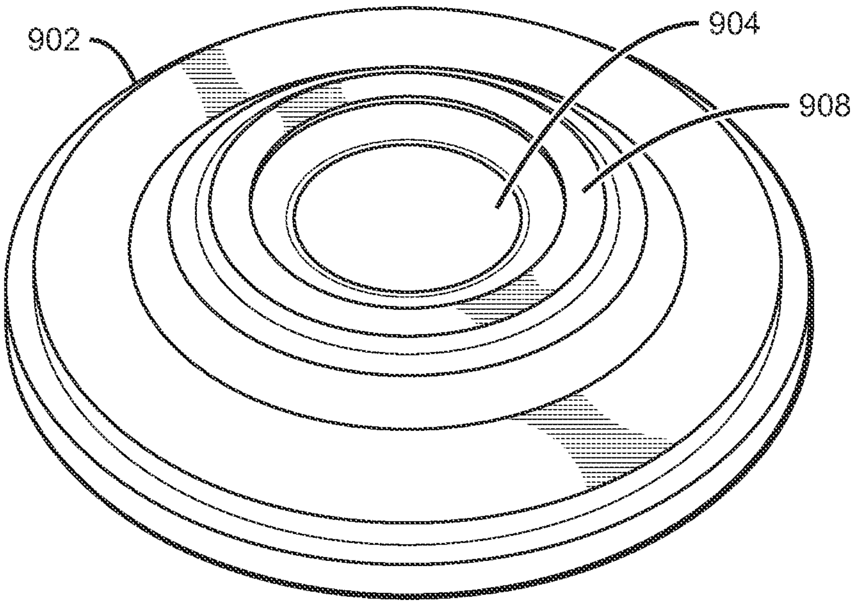
FIG. 24 is a bottom perspective view of the housing used in the contactor shown in FIG. 18.
Figure 25:
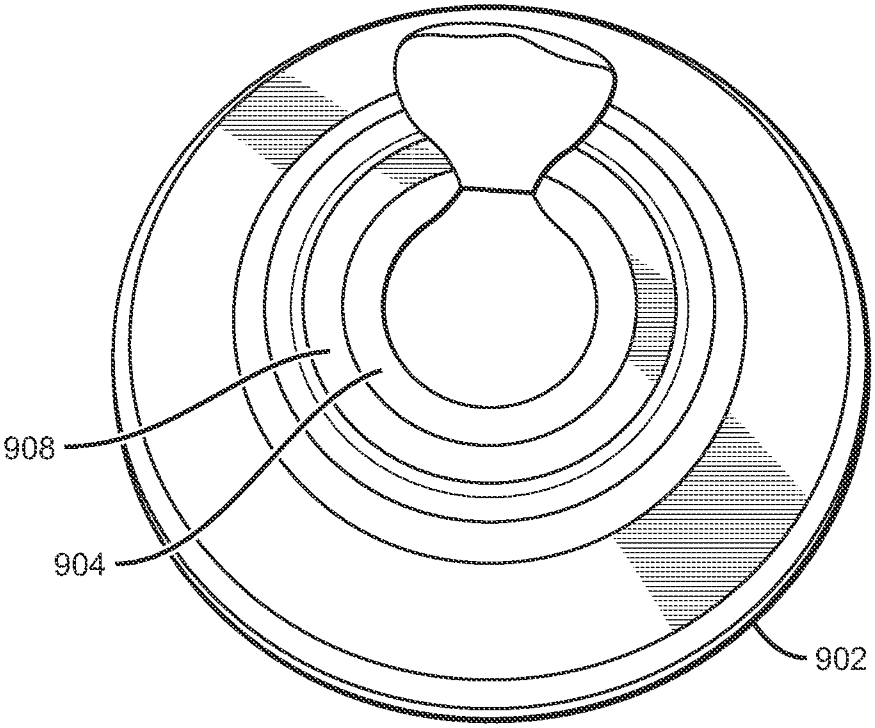
FIG. 25 is a bottom view of the housing used in the contactor shown in FIG. 18 following rupture of the rupture disk.

Referring now to FIGS. 24 and 25, the bottom surface if the housing 902 is shown with a rupture disk 904 and weld ring 908. The rupture disk 904 is shown following a high-pressure rupture event within the housing with the central portion of the rupture disk 904 being forced open to allow the pressure to pass from the housing 902 through the now opened rupture disk 904.

The above describes the pressure relief mechanism as being in the bottom surface of the contactor housing, but it is understood that the pressure relief mechanisms can be in different locations and on different features of the contactor or fuse. In some embodiments, the contactor can comprise a ceramic header and the pressure relief mechanism can be arranged in the ceramic header. In some of these embodiments, the pressure relief mechanism can comprise a rupture disk brazed in the ceramic header such as adjacent the power terminals. In other embodiments where the contactor or fuse has an upper epoxy section, the pressure relief mechanism can be integrated in the upper epoxy section. These are only a couple examples of the different locations for the pressure relief mechanisms according to the present invention.

It is understood that different embodiments can comprise other types of pressure relief mechanisms valves, vents, apertures, etc. Some of the pressure relief mechanisms can be replaceable or resettable following a high-pressure event.

Although the present invention has been described in detail with reference to certain preferred configurations thereof, other versions are possible. Embodiments of the present invention can comprise any combination of compatible features shown in the various figures, and these embodiments should not be limited to those expressly illustrated and discussed. Therefore, the spirit and scope of the invention should not be limited to the versions described above.

We claim:

1. An electrical switching device, comprising:

a hermitically sealed housing comprising a rupture disk hole formed in a floor of the hermetically sealed housing;

internal components within the hermetically sealed housing, the internal components configured to change the state of the switching device from a closed state and an open state in response to input, wherein the closed state allows current flow through the device and the open state interrupts current flow through the device;

contact structures electrically connected to the internal components for connection to external circuitry, wherein the housing comprises a pressure relief mechanism to allow pressure internal to the housing to escape from the housing; and a rupture disk fixed to the housing and sealing the rupture disk hole, wherein, in response to an increased air pressure inside the housing and acting on the rupture disk, the rupture disk at least partially separates from the housing to allow the increased air pressure to escape from the housing through the rupture disk hole.

2. The switching device of claim 1, wherein:

the rupture disk hole comprises an offset at least partially circumscribing the rupture disk hole; and the rupture disk comprises a flange sized to be received in the offset.

3. The switching device of claim 2, wherein:

the housing defines a top portion and a bottom portion;

the internal components are disposed in the top portion and the floor is disposed in the bottom portion, the switching device further comprising:

a path fluidly connecting the top portion and the bottom portion, wherein the increased air pressure is generated in the top portion and passes to the bottom portion via the path to escape through the rupture disk hole.

4. The switching device of claim 3, wherein the rupture disk is mounted on the inside surface of the housing.

5. The switching device of claim 3, wherein the rupture disk is mounted on the outside surface of the housing.

6. The switching device of claim 3, further comprising a weld ring to mount the rupture disk to the rupture disk hole.

7. The switching device of claim 3, further comprising an epoxy to mount the rupture disk to the rupture disk hole.

8. The switching device of claim 1, wherein the rupture disk is made from a metal material.

9. The switching device of claim 1, wherein the rupture disk is a reverse buckling rupture disk.

10. The switching device of claim 1, wherein the internal pressure is formed from arcing during the changing the state of the switching device.

11. The switching device of claim 1, further comprising paths through the internal components to allow internal pressure to pass to the pressure relief mechanism.

12. A contactor device, comprising:

a hermitically sealed housing;

internal components within the hermetically sealed housing, the internal components configured to change the state of the contactor device between a closed state and an open state in response to input, the internal components generating arcing pressure when changing states from closed to open; and a pressure relief mechanism to allow said arcing pressure to escape from the housing, the pressure relief mechanism comprising a weakened portion of a bottom of the housing, wherein the bottom of the housing has a first thickness and the weakened portion comprises, at least in part, a portion of the bottom having a second thickness thinner than the first thickness, the portion of the bottom comprising, at least in part, a scored portion, and wherein, in response to the arcing pressure, an opening is formed at the weakened portion.

13. The contactor device of claim 12, wherein the scored portion comprises a first score on a first surface of the bottom and a second score on a second surface of the bottom, opposing the first score.

14. The contactor device of claim 12, wherein the scored portion is at least partially arcuate.

15. The contactor device of claim 12, wherein the scored portion comprises a first score line and a second score line intersecting the first score line.

16. The contactor device of claim 12, wherein the scored portion is circular.

17. The contactor device of claim 12, wherein the weakened portion comprises one or more stamps in the housing.

18. The contactor device of claim 12, further comprising paths through the internal components to allow internal pressure to pass to the pressure relief mechanism.

19. An electrical switching device, comprising:

a hermitically sealed housing comprising a rupture disk hole formed in a floor of the hermetically sealed housing;

internal components within the hermetically sealed housing, the internal components configured to change the state of the electrical switching device from a closed state to an open state in response to input;

contact structures electrically connected to said internal components for connection to external circuitry; and a rupture disk sealing the rupture disk hole, wherein, in response to an increased air pressure inside the housing and acting on the rupture disk, the rupture disk at least partially separates from the housing to allow the increased air pressure to escape from the housing through the rupture disk hole.

* * * * *